(12) United States Patent
Koh

(10) Patent No.: US 12,051,244 B2
(45) Date of Patent: Jul. 30, 2024

(54) IMAGE GENERATING APPARATUS, IMAGE GENERATING METHOD, IMAGE GENERATING PROGRAM, AND RECORDING MEDIUM

(71) Applicant: Pioneer Corporation, Tokyo (JP)

(72) Inventor: Yoshihiro Koh, Tokyo (JP)

(73) Assignee: PIONEER CORPORATION, Tokyo (JP)

( * ) Notice: Subject to any disclaimer, the term of this patent is extended or adjusted under 35 U.S.C. 154(b) by 96 days.

(21) Appl. No.: 17/799,137

(22) PCT Filed: Jan. 14, 2021

(86) PCT No.: PCT/JP2021/001063
§ 371 (c)(1),
(2) Date: Aug. 11, 2022

(87) PCT Pub. No.: WO2021/161711
PCT Pub. Date: Aug. 19, 2021

(65) Prior Publication Data
US 2023/0076508 A1 Mar. 9, 2023

(30) Foreign Application Priority Data
Feb. 13, 2020 (JP) .................................. 2020-022844

(51) Int. Cl.
*G06V 20/40* (2022.01)
*G06V 10/74* (2022.01)
*G06V 20/10* (2022.01)

(52) U.S. Cl.
CPC ............ *G06V 20/46* (2022.01); *G06V 10/761* (2022.01); *G06V 20/10* (2022.01)

(58) Field of Classification Search
CPC ...... G06V 20/46; G06V 10/761; G06V 20/10; G06F 16/739; G11B 27/005; G11B 27/34; H04N 9/8205; H04N 23/60; H04N 5/77
See application file for complete search history.

(56) References Cited

U.S. PATENT DOCUMENTS

| 8,786,630 B2 | 7/2014 | Iwase et al. |
| 9,953,680 B2 * | 4/2018 | Kim ..................... G11B 27/326 |

(Continued)

FOREIGN PATENT DOCUMENTS

| JP | 2002-281432 A | 9/2002 |
| JP | 2007-135067 A | 5/2007 |

(Continued)

OTHER PUBLICATIONS

Extended European Search Report received in corresponding EP Application No. 21753490.8, dated Jan. 5, 2024, in 8 pages.

*Primary Examiner* — Shahbaz Nazrul
(74) *Attorney, Agent, or Firm* — Procopio, Cory, Hargreaves & Savitch LLP

(57) ABSTRACT

An image generating apparatus includes: a moving image acquisition unit that acquires a series of moving images of a landscape shot from a moving body; a moving distance acquisition unit that acquires a cumulative moving distance from a time when shooting of the series of moving images is started to a time when each of a plurality of frame images constituting the series of moving images is shot; a moving-distance retaining moving image generating unit that generates a moving-distance retaining moving image in which the cumulative moving distance is mapped to each of the plurality of frame images; and a thumbnail image generating unit that extracts a plurality of frame images from the moving-distance retaining moving image as a plurality of thumbnail images according to the cumulative moving dis- (Continued)

tance and generates a thumbnail image group arranging the plurality of thumbnail images in an order of the cumulative moving distance.

6 Claims, 14 Drawing Sheets

(56) References Cited

U.S. PATENT DOCUMENTS

| | | |
|---|---|---|
| 2007/0109414 A1 | 5/2007 | Liao et al. |
| 2015/0105934 A1* | 4/2015 | Palmer .................... G07C 5/12 |
| | | 701/1 |
| 2018/0132006 A1* | 5/2018 | Galant ................. G11B 27/105 |
| 2022/0086397 A1* | 3/2022 | Koh .......................... B60R 1/00 |

FOREIGN PATENT DOCUMENTS

| | | |
|---|---|---|
| JP | 2011-29852 A | 2/2011 |
| JP | 2013-183218 A | 9/2013 |
| JP | 2020-013070 A1 | 1/2020 |
| JP | 2020-103070 A | 1/2020 |
| WO | 2020/017600 A | 1/2020 |
| WO | 2020/017600 A1 | 1/2020 |

* cited by examiner

TB1

| FRAME NUMBER | ELAPSED TIME FROM THE START OF SHOOTING (sec) | TRAVELING DISTANCE FROM THE START OF SHOOTING (m) |
|---|---|---|
| 1 | 0 | 0 |
| ⁎ | ⁎ | ⁎ |
| ⁎ | ⁎ | ⁎ |
| ⁎ | ⁎ | ⁎ |
| 1800 | 60 | 1000 |
| ⁎ | ⁎ | ⁎ |
| ⁎ | ⁎ | ⁎ |
| ⁎ | ⁎ | ⁎ |
| 3600 | 120 | 2000 |
| ⁎ | ⁎ | ⁎ |
| ⁎ | ⁎ | ⁎ |
| ⁎ | ⁎ | ⁎ |
| 5400 | 180 | 2500 |
| ⁎ | ⁎ | ⁎ |
| ⁎ | ⁎ | ⁎ |
| ⁎ | ⁎ | ⁎ |
| ⁎ | ⁎ | ⁎ |
| ⁎ | ⁎ | ⁎ |
| ⁎ | ⁎ | ⁎ |

FIG. 5

| TB2 | | |
|---|---|---|
| TOTAL TRAVELING DISTANCE (km) | PLAYING SPEED (MULTIPLIER TO A BASIC SPEED) | FAST-FORWARDING/ FAST-REWINDING SPEED (MULTIPLIER TO A BASIC SPEED) |
| 0.5 | ×1.0 | ×10 |
| 1 | ×1.0 | ×10 |
| 5 | ×1.0 | ×10 |
| 10 | ×1.25 | ×20 |
| 30 | ×1.5 | ×60 |
| 60 | ×1.75 | ×120 |
| 80 | ×2.0 | ×120 |

Fig. 11

IMAGE GENERATING APPARATUS, IMAGE GENERATING METHOD, IMAGE GENERATING PROGRAM, AND RECORDING MEDIUM

TECHNICAL FIELD

The present invention relates to an image generating apparatus, an image generating method, an image generating program, and a recording medium, particularly to an image generating apparatus, an image generating method, an image generating program, and a recording medium, which are for generating images such as thumbnails of moving image.

BACKGROUND ART

There is a known technique for generating thumbnails to allows a user to specify a location where the user desires to start playing moving images.

For example, Patent Document 1 discloses a moving image searching apparatus using a time-directional searching method for searching moving image content in the time direction. The moving image searching apparatus extracts thumbnails from the moving image content in real time using a time code sequence, and displays the search results.

Patent Document 1: Japanese Unexamined Patent Application Publication No. 2002-281432

DISCLOSURE OF THE INVENTION

Problems to be Solved by the Invention

For example, one of problems is that when using thumbnails as described above to play a moving image in which a landscape viewed from a moving body is shot by a camera mounted on the moving body, for example, and when the amount of movement of the moving body per unit time is small, many thumbnails with similar contents may be displayed, and the process of finding the thumbnails corresponding to the desired location may be cumbersome.

The present invention is made in view of the above-mentioned points, and one of the objects of the present invention is to provide an image generating apparatus, an image generating method, an image generating program, and a recording medium, which are for generating thumbnail images that enable a user to easily find a desired location of a moving image by enabling an efficient search when the user searches for a location where the user desires to start playing the moving image, in playing a moving image in which a landscape is shot from a moving body.

Solutions to the Problems

The invention according to claim 1 is an image generating apparatus. The image generating apparatus includes: a moving image acquisition unit that acquires a series of moving images of a landscape shot from a moving body; a moving distance acquisition unit that acquires a cumulative moving distance from a time when shooting of the series of moving images is started to a time when each of a plurality of frame images constituting the series of moving images is shot; a moving-distance retaining moving image generating unit that generates a moving-distance retaining moving image in which the cumulative moving distance at each time of shooting is mapped to each of the plurality of frame images; and a thumbnail image generating unit that extracts a plurality of frame images from the moving-distance retaining moving image as a plurality of thumbnail images according to the cumulative moving distance and generates a thumbnail image group arranging the plurality of thumbnail images in an order of the cumulative moving distance.

The invention according to claim 5 is an image generating method for an image generating apparatus generating a thumbnail image group. The image generating method includes: a moving image acquisition step of acquiring a series of moving images of a landscape shot from a moving body by a moving image acquisition unit; a moving distance acquisition step of acquiring a cumulative moving distance from a time when shooting of the series of moving images is started to a time when each of a plurality of frame images constituting the series of moving images is shot by a moving distance acquisition unit; a moving-distance retaining moving image generating step of generating a moving-distance retaining moving image in which the cumulative moving distance at each time of shooting is mapped to each of the plurality of frame images by a moving-distance retaining moving image generating unit; and a thumbnail image generating step of extracting a plurality of frame images from the moving-distance retaining moving image as a plurality of thumbnail images according to the cumulative moving distance and generating a thumbnail image group arranging the plurality of thumbnail images in an order of the cumulative moving distance by a thumbnail image generating unit.

The invention according to claim 6 is an image generating program executed by an image generating apparatus including a computer. The image generating program causes the computer to execute: a moving image acquisition step of acquiring a series of moving images of a landscape shot from a moving body by a moving image acquisition unit; a moving distance acquisition step of acquiring a cumulative moving distance from a time when shooting of the series of moving images is started to a time when each of a plurality of frame images constituting the series of moving images is shot by a moving distance acquisition unit; a moving-distance retaining moving image generating step of generating a moving-distance retaining moving image in which the cumulative moving distance at each time of shooting is mapped to each of the plurality of frame images by a moving-distance retaining moving image generating unit; and a thumbnail image generating step of extracting a plurality of frame images from the moving-distance retaining moving image as a plurality of thumbnail images according to the cumulative moving distance and generating a thumbnail image group arranging the plurality of thumbnail images in an order of the cumulative moving distance by a thumbnail image generating unit.

BRIEF DESCRIPTION OF THE DRAWINGS

FIG. 5 is a diagram illustrating an example of data used for the generation of thumbnails according to the embodiment.

FIG. 11 is a diagram illustrating an example of data used for play control of a moving image in a modification of the embodiment.

DESCRIPTION OF PREFERRED EMBODIMENTS

An embodiment of the present invention is described in detail below. Further, in the following description and accompanying drawings, the same reference signs are given to substantially the same or equivalent parts.

Embodiment

Figure 1:
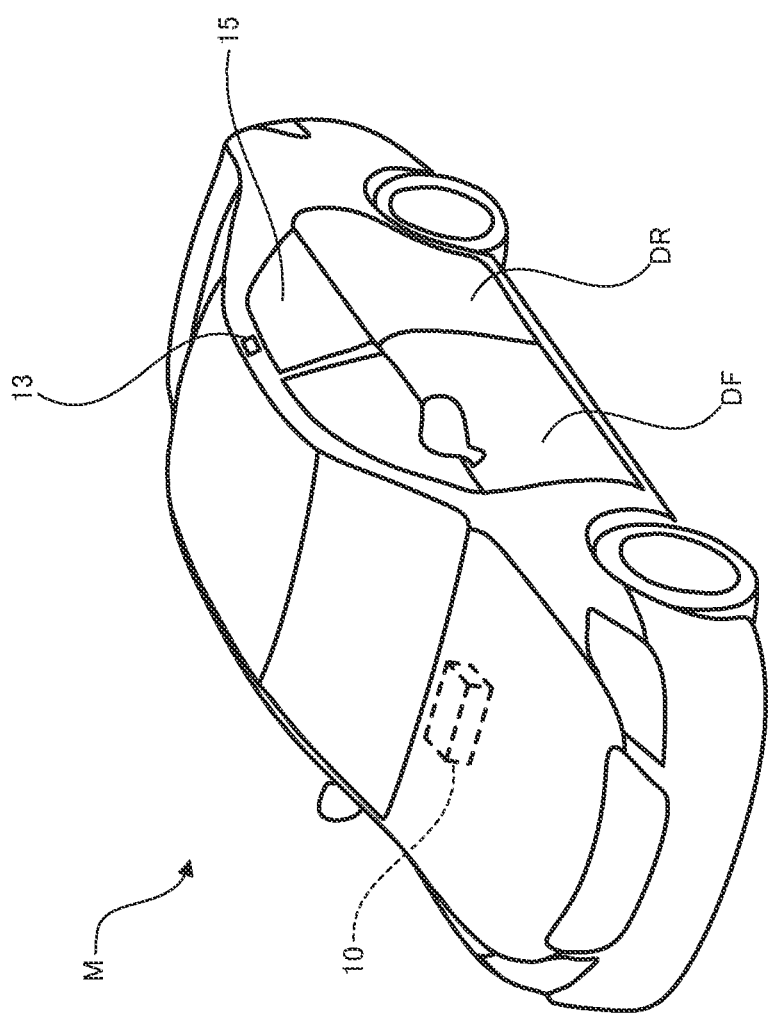
FIG. 1 is a perspective view of an automobile mounted with an image generating apparatus according to an embodiment.

FIG. 1 is a diagram schematically illustrating a configuration of an image generating apparatus 10 according to the embodiment of the present invention. The image generating apparatus 10 is mounted on a moving body, for example, and is configured to be able to output a video by importing a landscape moving image taken during a travel by a camera mounted on the moving body and playing the moving image. In addition, the image generating apparatus 10 is configured to be able to generate a thumbnail image of the moving image.

For example, the image generating apparatus 10 outputs the thumbnail image to a display apparatus mounted on the moving body. Further, for example, the image generating apparatus 10 outputs a video in which a moving image is played to the display apparatus mounted on the moving body.

Further, for example, the image generating apparatus 10 also functions as a moving image playing apparatus that displays thumbnail images on the display apparatus, receives a selection operation of the thumbnail images, and outputs a video in which the moving image is played by locating a start according to the selected thumbnail image.

In this embodiment, an example in which the image generating apparatus 10 is mounted on an automobile M, which is the moving body, is described. As shown in FIG. 1, the image generating apparatus 10 is mounted, for example, in the dashboard of the automobile M.

A camera 13 is a video camera mounted on, for example, a roof portion, a door panel portion, or the like of the automobile M to enable a side of the automobile M to be shot. The camera 13 is communicatively connected to the image generating apparatus 10 and is configured to be able to transmit shot still images or moving images to the image generating apparatus 10.

The moving image shot by the camera 13 is imported into the image generating apparatus 10. For example, the camera 13 is set to start shooting when the automobile M starts the engine and begins traveling. In addition, for example, a video camera capable of shooting the front and rear of the automobile M may be further mounted to the automobile M.

A first display 15 is a display apparatus provided in a window portion of the automobile M. In this embodiment, the case where the first display 15 is a transparent display mounted to the door instead of the window glass of the automobile M is described.

For example, the first display 15 is mounted to a rear door DR. Further, the first display 15 is not limited to the case of being mounted instead of the window glass, and the first display 15 may be attached to the inside of the window glass of the automobile M, for example. Further, the first display 15 may be mounted to, for example, a front door DF, or may be attached to the inside of the windshield, for example.

The first display 15 may be, for example, an organic EL display or an inorganic EL display, for example, a liquid crystal display. For example, the transmittance of the first display 15 with respect to visible light is equal to or higher than a predetermined value so that the landscape on the other side can be seen with the naked eye when at least a moving image is not displayed.

The first display 15 is connected to the image generating apparatus 10 by wire or wirelessly. The first display 15 has a display surface facing the indoor (inside the cabin) side of the automobile M, and displays the moving image output from the image generating apparatus 10 toward the cabin side of the automobile M. For example, a user inside the automobile M can view a moving image of the landscape viewed from the automobile M in a manner similarly to looking out a window.

Figure 2:
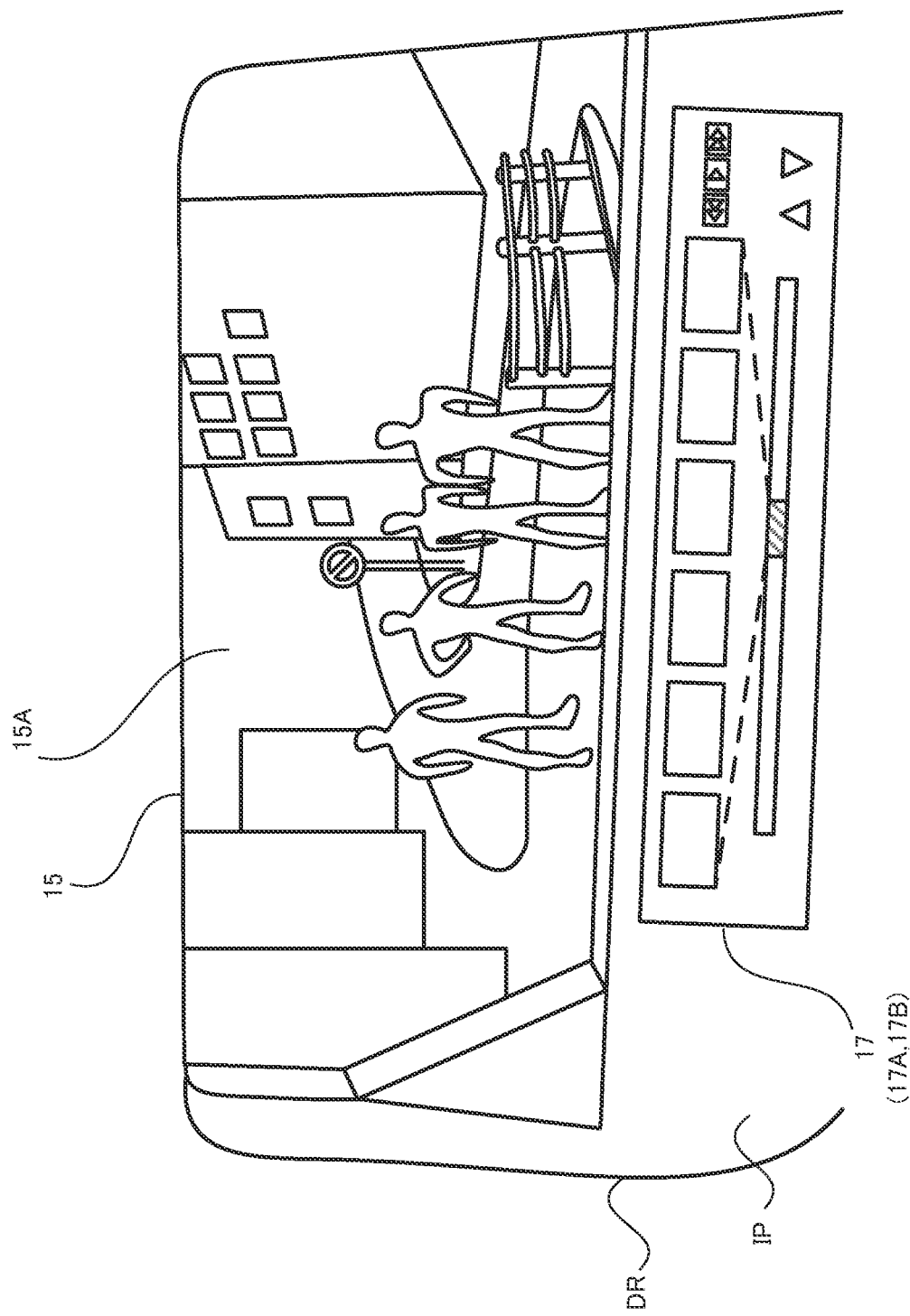
FIG. 2 is a diagram schematically illustrating a display unit viewed from the inside of the automobile mounted with the image generating apparatus according to the embodiment.

FIG. 2 is a schematic diagram of the first display 15 (that is, the window of the automobile M) and part of the rear door DR, as seen from the interior of the automobile M. FIG. 2 shows the rear door DR as viewed from the rear seat.

The first display 15 has a moving image display surface 15A facing the inside of the automobile M. In FIG. 2, the moving image display surface 15A displays the moving image shot from the automobile M, which is played by the image generating apparatus 10.

A touch panel 17 is a touch panel display mounted to the inside of the door panel of the rear door DR. For example, the touch panel 17 extends along a top edge portion of an inner panel IP of the rear door DR on the surface of the inner panel IP, as shown in FIG. 2. The touch panel 17 has a rectangular shape whose longitudinal direction is the direction along the top edge portion of the inner panel.

The touch panel 17 is a touch panel including a second display 17A and a touchpad 17B. The second display 17A is a display apparatus such as a liquid crystal display apparatus or an organic EL display apparatus. The touchpad 17B is, for example, a pressure-sensitive or electrostatic transparent touchpad that is attached to the display surface of the second display 17A and receives operations with a human finger or the like.

The touch panel 17 is communicably connected to the image generating apparatus 10 and can display the image output from the image generating apparatus 10. Further, the touch panel 17 can receive the operation of playing, fast-forwarding, or fast-rewinding the moving image displayed on the first display 15, and can send an instruction based on the reception of the operation to the image generating apparatus 10.

Figure 3:
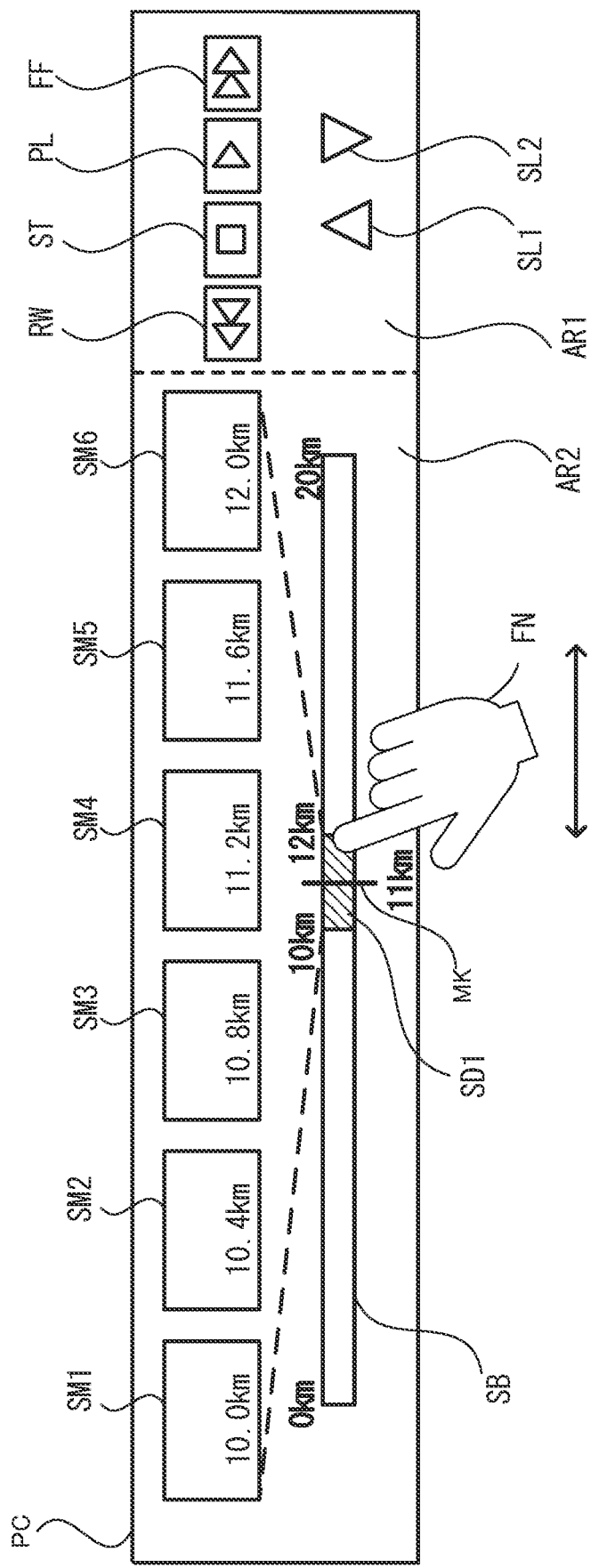
FIG. 3 is a diagram illustrating an example of an image displayed on a touch panel according to the embodiment.

FIG. 3 is a diagram illustrating an example of a play operation image PC, which is an image for operation displayed on the touch panel 17 for playing a moving image.

FIG. 3 shows the play operation image PC and a finger FN of the user who is operating using the play operation image PC.

As shown in FIG. 3, the play operation image PC includes a button area AR1, which is the area where buttons for operation are displayed, and a search area AR2, which is the area where images for searching parts of the moving image are displayed.

In the button area AR1, a play button PL, a stop button ST, a fast forward button FF and a fast rewind button RW are displayed. For example, the user can input play, stop, fast forward, or fast rewind operations of the moving image by touching the finger FN to the area where these buttons are displayed. For example, by touching the finger FN to the area where the play button PL is displayed, a series of moving images can be played by the image generating apparatus 10 and displayed on the moving image display surface 15A (see FIG. 2) of the first display 15.

A seek bar SB is displayed in the search area AR2. As shown in FIG. 3, the seek bar SB is a bar-shaped portion extending along the direction parallel to the long side of the play operation image PC. In the seek bar SB, a slider SD1 is displayed as a marker to indicate which part of the moving image being played by the image generating apparatus 10 is the video being played on the first display 15. The slider SD1 occupies a section in the extension direction of the seek bar SB.

Specifically, for example, the position at the left end of the seek bar SB corresponds to the beginning of the moving image, and the position at the right end of the seek bar SB corresponds to the end of the moving image. In addition, the section occupied by the slider SD1 in the extension direction of the seek bar SB corresponds to a part of the moving image.

A marker MK is displayed at the center of the slider SD1. The distance from the left end of the seek bar SB to the marker MK corresponds to the cumulative traveling distance (hereinafter also referred to as accumulated traveling distance) of the automobile M from the time when the moving image shooting starts to the time when the video being played on the first display 15 is shot. In other words, the axis along the extension direction of the seek bar SB corresponds to the cumulative traveling distance.

Therefore, the video shot at the time when the automobile M is traveling (existing) at the location corresponding to the position on the seek bar SB is the part of the moving image corresponding to the position on the seek bar SB.

FIG. 3 shows an example where the cumulative traveling distance at the end of the moving image shooting, that is, the total traveling distance as the moving distance of the automobile M from the beginning to the end of the series of moving image shootings, is 20 km. In other words, the end of the moving image corresponds to a cumulative traveling distance of 20 km.

In addition, FIG. 3 shows an example in which the slider SD1 is displayed in the section corresponding to the cumulative traveling distance of 10 km-12 km on the seek bar SB. The marker MK is displayed at the position of 11 km. The cumulative traveling distance of 11 km indicated by the marker MK at the center of the slider SD1 corresponds to the cumulative traveling distance of the automobile M at the time when the part of the moving image being displayed on the first display 15 is shot.

That is, in the example shown in FIG. 3, the video being displayed on the first display 15 (FIG. 2) is the video shot at the location where the automobile M was traveling when the cumulative traveling distance of the automobile M was 11 km among the series of moving images.

The slider SD1 moves in the area of the seek bar SB along the long side direction of the seek bar SB. For example, the user can change the position of the slider SD1 in the seek bar SB by moving the finger FN in the directions along the long side of the seek bar SB, that is, in the directions of the arrows in FIG. 3 to perform operations such as drag.

For example, when the position of the slider SD1 is changed, the part of the moving image shot at the location corresponding to the position of the marker MK that moves with the slider SD1 is displayed on the first display 15.

Each of the thumbnail images SM1 to SM6 is a thumbnail image generated by the image generating apparatus 10 and displayed on the second display 17A. A thumbnail image is a small image that is displayed in the play operation image PC to give the user a clue, for example, to search which part of the series of moving images to play first or to locate the start.

For example, each thumbnail image is an image that is thumbnailed by, for example, reducing one of a plurality of frame images constituting the series of moving images. Therefore, the user can check a part of the contents of the series of moving images by looking at the thumbnail images.

For example, the thumbnail images SM1 to SM6 are generated by reducing and arranging a plurality of frame images extracted from all the frame images constituting the moving image such that the locations at which respective images are shot are at equal distance intervals. In the example shown in FIG. 3, the respective thumbnail images SM1 to SM6 are arranged at equal distance intervals of every 0.4 km of traveling distance.

Each of the thumbnail images is mapped to the cumulative traveling distance of the automobile M at the time when each of the corresponding frame images is shot. Therefore, the locations at which respective frame images that correspond to the respective thumbnail images are shot correspond to the positions along the axis of the seek bar SB.

Each distance of the interval of thumbnail images may be, for example, a fixed value, or may be changed automatically, for example. For example, when the cumulative traveling distance at the end of the series of moving images becomes large, the distance interval may be automatically changed to a larger value.

Further, in the example shown in FIG. 3, each of the thumbnail images SM1 to SM6 is a thumbnail image of a part of the frame images shot in the traveling section of the automobile M corresponding to the section occupied by the slider SD1 in the extension direction of the seek bar SB. In other words, the slider SD1 shows the thumbnail display section for which the thumbnail images are displayed.

In FIG. 3, specifically, the thumbnail display section shown by the slider SD1 regarding the thumbnail images SM1 to SM6 is the section where the cumulative traveling distance of the automobile M is from 10 km to 12 km.

Further, as shown in FIG. 3, an enlargement button SL1 and a reduction button SL2 may be displayed in the button area AR1 of the play operation image PC. For example, the enlargement button SL1 and the reduction button SL2 may enlarge or reduce the thumbnail display section to display thumbnail images corresponding to frame images shot in longer or shorter sections. In addition, the slider SD1 may be enlarged or reduced in the extension direction of the seek bar SB as the displayed thumbnail images are changed.

Further, the cumulative traveling distance indicated by the seek bar SB may be changed by the enlargement button SL1 and the reduction button SL2. As the cumulative traveling distance indicated by the seek bar SB is changed, the thumbnail images may be displayed at changed distance intervals. For example, the enlargement button SL1 may be pressed to change the left end of the seek bar SB to correspond to a location with a cumulative traveling distance of 5 km and change the right end of the seek bar SB to correspond to a location with a cumulative traveling distance of 10 km, and thus, the thumbnail images may be displayed at shorter distance intervals.

Figure 4:
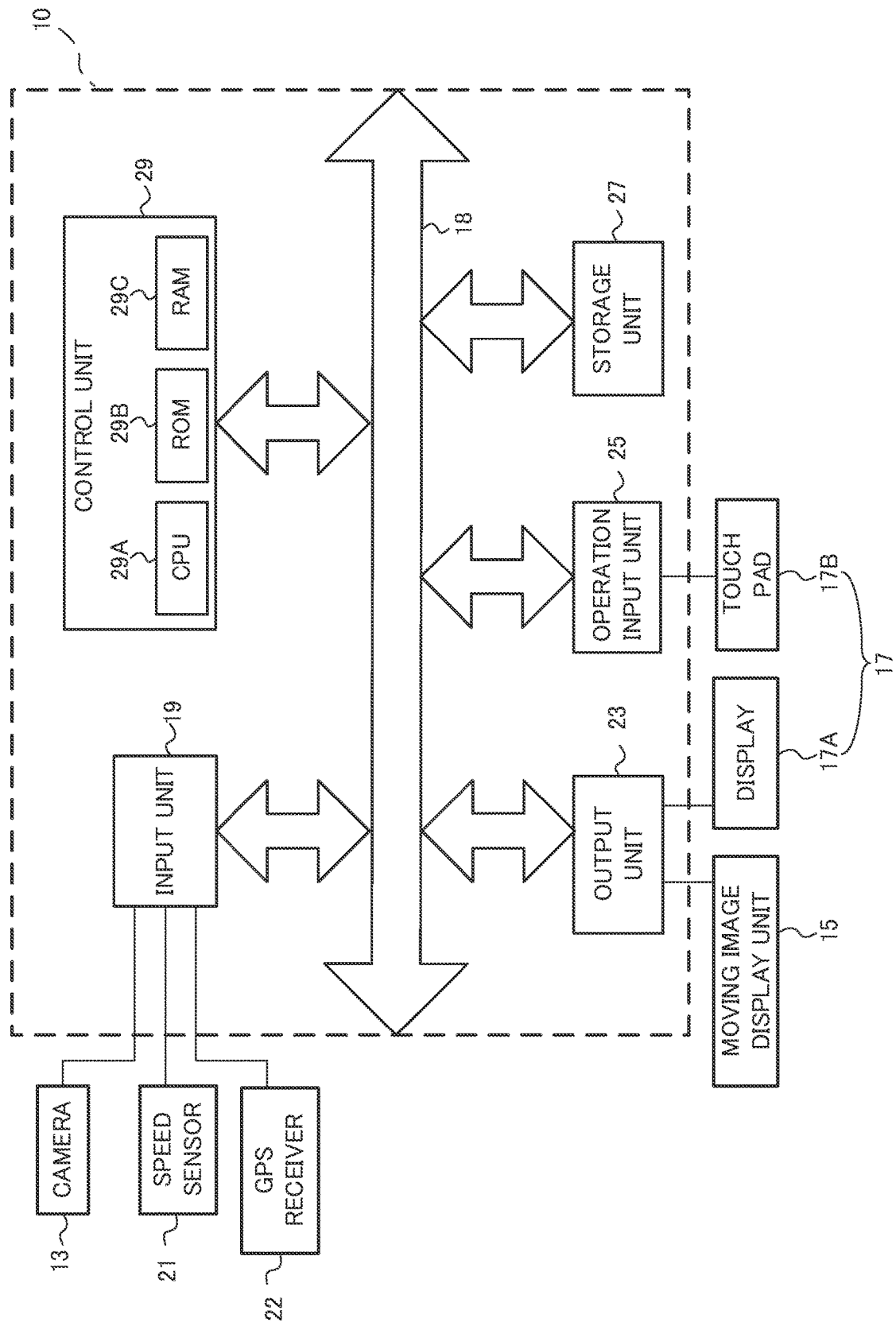
FIG. 4 is a functional block diagram of the image generating apparatus according to the embodiment.

FIG. 4 is a functional block diagram of the image generating apparatus 10. The image generating apparatus 10 is, for example, an apparatus whose various parts cooperate via a system bus 18.

An input unit 19 is an interface of the image generating apparatus 10 for acquiring data from external instruments. The input unit 19 is connected to the camera 13, which is an instrument provided in the automobile M. For example, the image generating apparatus 10 can import a landscape moving image from the camera 13 via the input unit 19.

Further, the input unit 19 is connected to a speed sensor 21 that can acquire the speed of the automobile M and a GPS receiver 22 that can receive information from the Global Positioning System (GPS), one of the Global Navigation Satellite Systems (GNSS), which acquires position information of the automobile. That is, the image generating apparatus 10 is configured to be able to acquire the speed of the automobile M from the speed sensor 21 and GPS information from the GPS receiver 22.

An output unit 23 is an interface of the image generating apparatus 10 for outputting data to external instruments. The output unit 23 is connected to the first display 15 and the second display 17A of the touch panel 17.

For example, the output unit 23 outputs videos in which a series of moving images is played by the image generating apparatus 10 to the first display 15. For example, the output unit 23 outputs an operation image for play operations to the second display 17A. In addition, for example, the output unit 23 outputs the thumbnail images generated by the image generating apparatus 10 to the second display 17A.

An operation input unit 25 is an interface for acquiring operation input signals via the touchpad 17B of the touch panel 17. The operation input unit 25 is connected to the touchpad 17B and acquires operation input signals for the operation image displayed on the second display 17A. For example, the operation input unit 25 receives signals of various operation inputs to the play operation image PC as shown in FIG. 3.

A storage unit 27 includes, for example, a hard disk apparatus, a solid state drive (SSD), a flash memory, or the like, and stores various programs related to image processing, playing of moving image, and the like in the image generating apparatus 10. Further, the various programs, for example, may be acquired from another server apparatus or the like via a network (not shown), or may be recorded on a recording medium and read via various drive apparatuses. The various programs stored in the storage unit 27 can be transmitted via a network, and can be recorded on a computer-readable recording medium and transferred.

A control unit 29 includes a Central Processing Unit (CPU) 29A, a Read Only Memory (ROM) 29B, a Random Access Memory (RAM) 29C, and the like, and functions as a computer. Thus, the CPU 29A realizes various functions by reading and executing various programs stored in the ROM 29B and the storage unit 27.

For example, the control unit 29 acquires the moving image shot by the camera 13 via the input unit 19 and functions as a moving image acquisition unit.

For example, the control unit 29 acquires the speed of the automobile M via the input unit 19, and acquires the cumulative traveling distance from the speed and the traveling time.

For example, the control unit 29 acquires the current position information of the automobile M from the data of the GPS receiver 22 via the input unit 19, and calculates the cumulative traveling distance of the automobile M from the position and time instant of the automobile M.

The control unit 29 functions as a moving distance acquisition unit when acquiring the cumulative traveling distance (that is, the accumulated traveling distance) from the time when the automobile M starts traveling to the present based on information acquired from the speed sensor 21 or GPS receiver 22 via the input unit 19.

For example, the control unit 29 functions as a moving-distance retaining moving image generating unit, which generates a moving-distance retaining moving image, by mapping each of the frame images constituting the series of moving images acquired from the camera 13 via the input unit 19 to the cumulative traveling distance of the automobile M at the shooting time when each of the frame images is shot. In addition, the control unit 29 functions as a recording control unit that stores a generated moving-distance retaining moving image in the storage unit 27.

In addition, for example, the control unit 29 functions as a thumbnail image generating unit that generates thumbnail images (for example, SM1 to SM6 in FIG. 3) from a moving-distance retaining moving image. For example, the control unit 29 extracts a plurality of frame images from all the frame images constituting the moving-distance retaining moving image, and generates a plurality of thumbnail images by reducing each of the extracted plurality of frame images. In other words, the control unit 29 extracts a plurality of frame images from the moving-distance retaining moving image as a plurality of thumbnail images to generate thumbnail images.

For example, the control unit 29, when extracting a plurality of frame images from a moving-distance retaining moving image, extracts each frame image according to the cumulative traveling distance at the shooting position of each frame image.

For example, when extracting a plurality of frame images from a moving-distance retaining moving image, the control unit 29 extracts the plurality of frame images such that the differences in cumulative moving distance at the shooting positions of the respective frame images are equal. In other words, the control unit 29 extracts the plurality of frame images such that the locations at which the respective frame images are shot are at equal distance intervals.

For example, when extracting a plurality of frame images at equal distance intervals, the control unit 29 always sets the distance interval between the locations where each of the plurality of frame images is shot to a constant distance interval.

For example, when generating thumbnail images, the control unit 29 extracts a plurality of frame images from a moving-distance retaining moving image generated from a series of moving images in an extraction manner based on the total moving distance, which is the moving distance of the automobile M from the time when the shooting of the series of moving images starts to the end of the shooting.

For example, the control unit 29 extracts a plurality of frame images from a moving-distance retaining moving image at distance intervals that vary according to the total traveling distance. Specifically, for example, the longer (larger) the total moving distance, the longer (larger) the distance interval at which the plurality of frame images are extracted.

For example, the control unit 29 as the thumbnail image generating unit may generate a thumbnail image group by arranging each of the generated plurality of thumbnail images. For example, a thumbnail image group is generated by arranging each of the plurality of thumbnail images in the order of cumulative traveling distance of the automobile M (that is, in the order of moving distance).

A thumbnail image group is a plurality of thumbnail images arranged in various manners. For example, a thumbnail image group may be thumbnail images arranged in the order of cumulative traveling distance of the automobile M (that is, in the order of moving distance), for example, in a straight line as shown in FIG. 3. In addition, a thumbnail image group, for example, may be a plurality of thumbnail images arranged in a circular or curvilinear pattern.

For example, the control unit 29 functions as a display control unit that controls the display of the generated thumbnail images or thumbnail image group on the second display 17A. The control unit 29 controls the display of each of the thumbnail images so that the thumbnail images are arranged along the extension direction of the seek bar SB in the order of traveling distance, that is, in the order of shooting the images, as shown in FIG. 3, for example.

The control unit 29 as the display control unit may, for example, control the display of the entire thumbnail image group, or may control the display of a part of the thumbnail image group. For example, when displaying a part of a thumbnail image group, the part of the thumbnail image group may be controlled to be displayed in a scrolling manner.

Further, the control unit 29 as the display control unit may arrange the thumbnail images generated by the thumbnail image generating unit in various manners when the thumbnail images are displayed on the second display 17A. For example, as shown in FIG. 3, a plurality of thumbnail images may be arranged linearly. In addition, for example, a plurality of thumbnail images may be arranged in a circular or curvilinear pattern.

In addition, for example, when displaying a plurality of thumbnail images, the control unit 29 as the display control unit may arrange and display the thumbnail images in such a way as to create a sense of depth and perspective by making the thumbnail images appear to be connected in the depth direction when the plurality of thumbnail images are displayed with an overlap and a size correlation therebetween.

In addition, the control unit 29 functions as an operation reception unit that receives instruction operations related to playing a series of moving images via the operation input unit 25. For example, the control unit 29 as the operation reception unit receives an instruction operation that instructs a play control unit to play, fast-forward or fast-rewind via an input operation to the touchpad 17B using the play operation image PC (FIG. 3).

The control unit 29 controls the play of the moving image to be displayed on the first display 15 via the output unit 23 according to the instruction operation. For example, the control unit 29 functions as the play control unit that controls to play, fast-forward or fast-rewind a series of moving images.

For example, when a selection operation of selecting one of the thumbnail images is received, the control unit 29 selects the head from the frame images corresponding to the thumbnail image selected by the selection operation, and provides a video, in which a series of moving images or a moving-distance retaining moving image is played, to the first display 15 via the output unit 23.

Furthermore, in this embodiment, play refers to playing the shot landscape moving image forward at a basic speed determined based on the timecode attached to the moving image. Moreover, fast-forwarding refers to playing the shot landscape moving image forward at a speed faster than the aforementioned basic speed. Moreover, fast-rewinding refers to playing the shot landscape moving image backward at a speed faster than the basic speed.

FIG. 5 is a diagram illustrating a table TB1, an example of data in which each of a plurality of frame images constituting a series of moving images is mapped to the traveling distance of the automobile M at the time each of the plurality of frame images is shot when a moving-distance retaining moving image is generated.

As shown in FIG. 5, in the table TB1, a frame number, which is a number assigned to each of the plurality of frame images constituting the series of moving images, is mapped to the elapsed time from the start of shooting till the time when each frame image is shot, and is mapped to the cumulative traveling distance from the starting time of shooting till the time when each frame image is shot.

For example, in the table TB1, the frame image of frame number 1 shot at the start of shooting is mapped to a traveling distance of 0 (m) from the start of shooting. In other words, the starting time of shooting is the starting time of the accumulation of the traveling distance. In addition, a time instant may be mapped instead of the elapsed time.

For example, the traveling speed of the automobile M varies from time to time depending on road conditions, or the like, and thus, the traveling distance per hour is not necessarily constant. For example, in the example shown in the table TB1 of FIG. 5, the traveling distance per 60 seconds during the elapsed time from 0 to 60 sec and the traveling distance per 60 seconds during the elapsed time from 60 to 120 sec are both 1 km. On the other hand, the traveling distance per 60 seconds during the elapsed time from 120 sec to 180 sec is 500 m.

As described above, in the image generating apparatus 10, the control unit 29 generates thumbnail images by extracting a plurality of frame images from all the frame images constituting the moving-distance retaining moving image as shown in FIG. 5.

When generating the thumbnail images, the control unit 29 extracts a plurality of frame images such that the differences between the cumulative traveling distances mapped to the frame images are equal using the table TB1, regardless of the intervals of elapsed time. Thus, a plurality of thumbnail images can be generated corresponding to the plurality of frame images extracted at equal distance intervals, regardless of the elapsed time.

On the other hand, when thumbnail images are generated by extracting a plurality of frame images at equal time intervals where the elapsed time intervals are equal, there may be cases where thumbnail images with little change in content are continuously generated, or cases where the interval between thumbnail images is too large with respect to the change in content.

For example, a moving image shot when the automobile M is traveling at a low speed may show less change in the moving image content per hour than a moving image shot when the automobile M is traveling at a high speed. In such cases, similar thumbnail images are displayed in succession, and it may take time for the user to find the desired thumbnail image.

In addition, for example, a moving image shot when the automobile M is traveling at a high speed may show a greater change in the moving image content per hour than a moving image shot when the automobile M is traveling at a low speed. In such cases, when the thumbnail images are generated by extracting a plurality of frames at equal time intervals, some landscapes may fail to appear in the thumbnail images, making it difficult for the user to find the desired thumbnail image.

In this embodiment, as shown in FIG. 5, each of all the frame images constituting the series of moving images is mapped to the traveling distance of the automobile M at the shooting time when each frame image is shot. Therefore, from all the frame images constituting the moving image, a plurality of frame images can be extracted such that the locations at which respective images are shot are at equal distance intervals. Therefore, the thumbnail images can be generated with reference to the traveling distance, regardless of the traveling speed.

Figure 6:
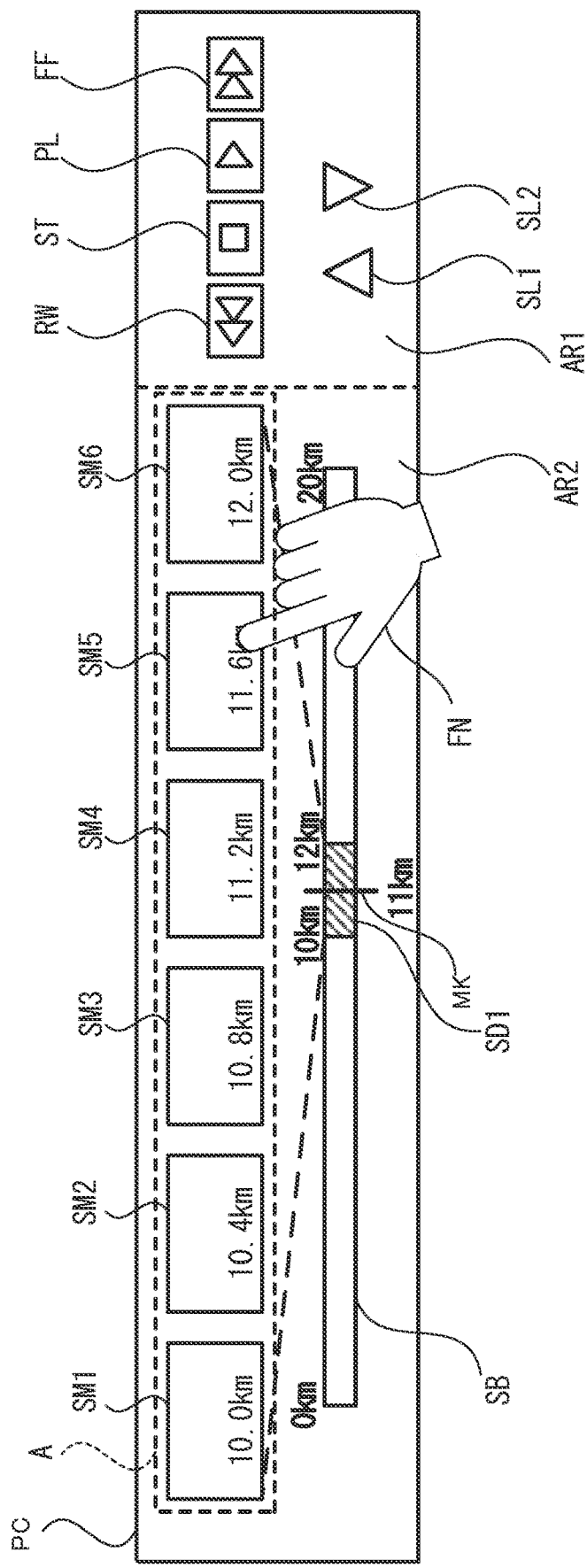
FIG. 6 is a diagram illustrating an example of selection manner of thumbnail according to the embodiment.

Referring to FIG. 6, the playing of moving image using thumbnail images is described. FIG. 6 shows an example of the play operation image PC. In FIG. 6, only the position of the user's finger FN differs from that of FIG. 3.

In FIG. 6, the thumbnail images SM1 to SM6 are arranged at equal distance intervals of every 0.4 km of the cumulative traveling distance. For example, the thumbnail images SM1 to SM6 may be a portion of a thumbnail image group arranged at equal distance intervals and displayed on the touch panel 17. For example, the area A enclosed by the dashed line in FIG. 6 may be the entire thumbnail image group or a portion of the thumbnail image group.

The user can select, via the touchpad 17B, one thumbnail image that corresponds to a part of a series of moving images that the user wants to start playing from among the thumbnail images SM1 to SM6. For example, the input operation for such a selection is received via the touchpad 17B by the finger FN touching the area on the second display 17A of the touch panel 17 where the said one thumbnail image is displayed.

FIG. 6 shows the user's finger FN selecting the thumbnail image SM5. For example, as shown in FIG. 6, when the user's finger FN touches the area on the second display 17A where the thumbnail image SM5 is displayed, an input operation for selecting the thumbnail image SM5 is received via the touchpad 17B, and a series of moving images starts to be played from the frame image corresponding to the thumbnail image SM5 and is displayed on the first display 15. In other words, the thumbnail image SM5 is used to locate the start.

In addition, for example, by touching the area where the play button PL is displayed after the user's finger FN touches the area where the thumbnail image SM5 is displayed, an input operation that instructs to play a series of moving images may be received.

According to this embodiment, as shown in FIG. 6, it is possible for the user to efficiently search for a desired thumbnail image from a plurality of thumbnail images arranged at equal distance intervals, regardless of the traveling speed of the automobile M at the time the series of moving images is shot. Thus, the user can easily find the thumbnail image that corresponds to the location where the user wants to start playing the series of moving images.

Moreover, when a user tries to search for a desired location in a series of moving images in which a landscape viewed from a moving body is shot, for example, the optimal difference in cumulative moving distance between adjacent thumbnails differs between the case when the user has an estimation of where the desired location is recorded in the aforementioned series of moving images and the case when the user has no such estimation. In the former case, a sequence of thumbnail images around the shooting location that is already estimated, wherein the difference in cumulative moving distance between the thumbnail images is relatively short, is effective, and in the latter case, it is necessary to first estimate approximately where the desired scene is recorded, and thus, a sequence of thumbnail images with a relatively large difference in cumulative moving distance between the thumbnail images is effective. To accommodate this, it is preferred that the image generating apparatus 10 allows the user to change the difference in cumulative distance between adjacent thumbnail images that are displayed on the display apparatus.

Figure 7:
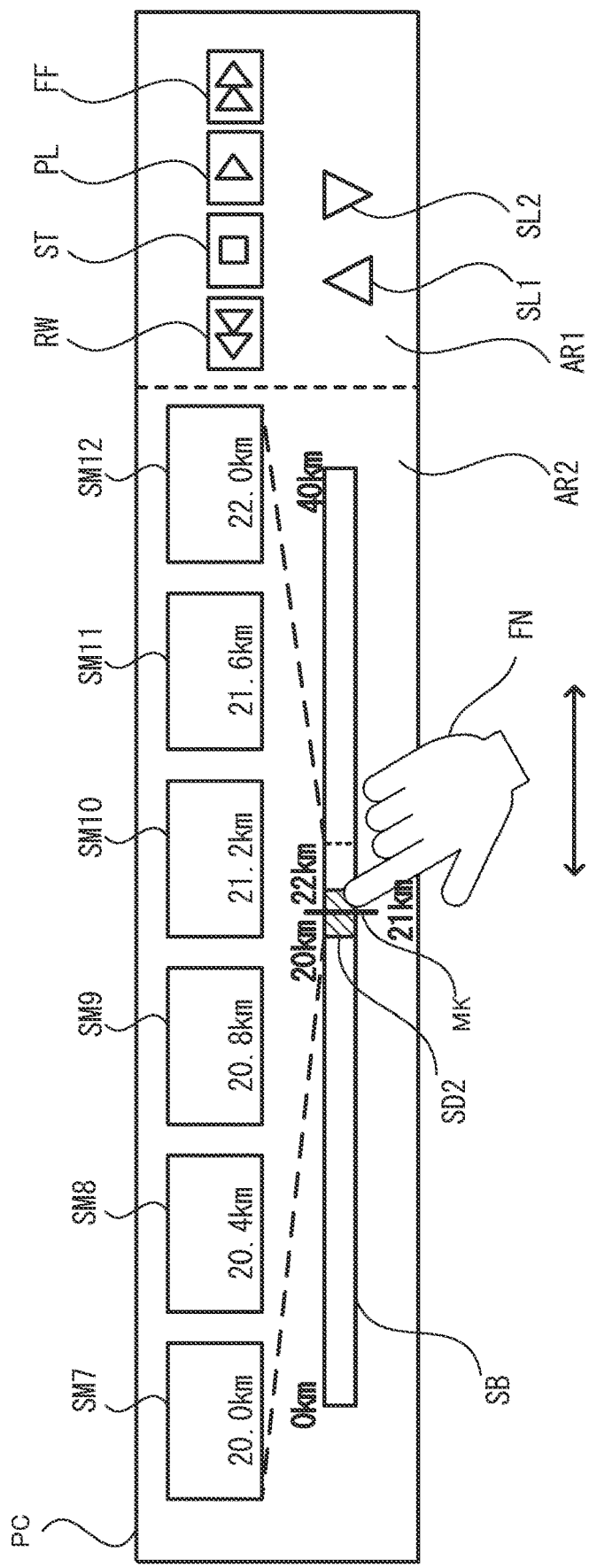
FIG. 7 is a diagram illustrating an example of display manner of thumbnail according to the embodiment.

FIG. 7 is a diagram illustrating an example of the play operation image PC. With reference to FIG. 7, it is explained a case where the cumulative traveling distance at the end of shooting a series of moving images is different from those in FIG. 3 and FIG. 6. In FIG. 7, the cumulative traveling distance at the end of shooting the series of moving images, that is, the total traveling distance as the traveling distance of the automobile M between the beginning and the end of shooting the series of moving images is 40 km.

In FIG. 7, the slider SD2 indicates the position corresponding to the cumulative traveling distance of 20-22 km on the seek bar SB as a thumbnail display section. The slider SD2 is similar to the slider SD1 shown in FIG. 3 and FIG. 6 in that the thumbnail display section indicated by the slider SD2 is 2 km.

In addition, as shown in FIG. 7, the thumbnail images SM7 to SM12 corresponding to the thumbnail display section indicated by the slider SD2 are displayed. Similarly to the thumbnail images SM1 to SM6, the thumbnail images SM7 to SM12 are arranged at equal distance intervals of every 0.4 km. Therefore, the thumbnail images are displayed at the same distance interval when the total traveling distance is 20 km and when the total traveling distance is 40 km.

Thus, in this embodiment, a plurality of thumbnail images arranged at equal distance intervals can be displayed in the play operation image PC.

Furthermore, the slider SD1 (FIG. 3) is displayed with a width corresponding to 2 km in the seek bar SB corresponding to a total traveling distance of 20 km. In contrast, the slider SD2 is displayed with a width corresponding to 2 km in the seek bar SB corresponding to a total traveling distance of 40 km, and therefore, the slider SD2 has a shorter length in the direction along the traveling distance than the slider SD1.

In addition, this is not limited to cases where the thumbnail images are displayed corresponding to the slider SD2, for example, the entire range of the moving image may be a thumbnail display section. For example, the number of thumbnail displays may be set to a constant number, and the thumbnail images may be displayed at equal distance intervals with the distance in units of the total traveling distance divided equally by the number of thumbnail images displayed. Moreover, for example, the number of thumbnail images to be generated may be set to a constant number, and the thumbnail images may be generated at equal distance intervals which are the total traveling distance equally divided by the number of thumbnail images to be generated.

Further, for example, the scale of the seek bar SB may be changed in real time to follow the current cumulative traveling distance of the automobile M. In such a case, the thumbnail images may still be displayed at a constant distance interval, and the size of the slider SD2 on the second display 17A may be changed.

Figure 8:
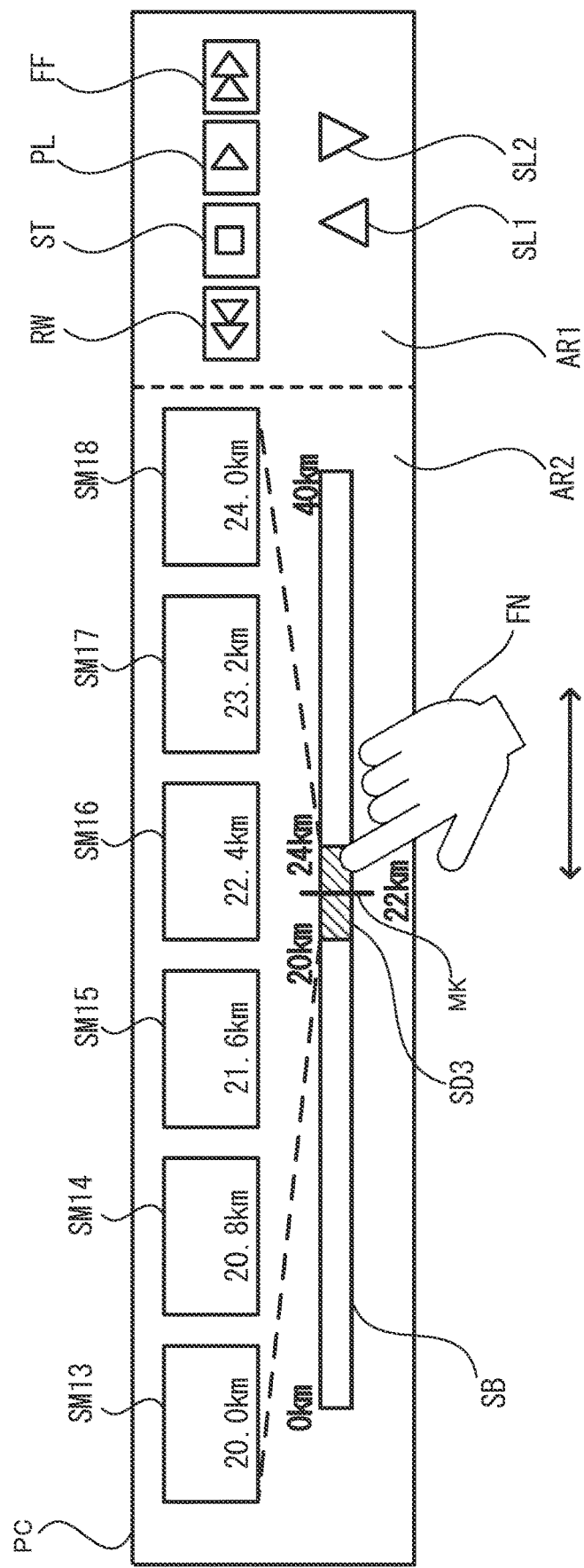
FIG. 8 is a diagram illustrating another example of display manner of thumbnail according to the embodiment.

FIG. 8 is a diagram illustrating an example of the play operation image PC. FIG. 8 shows a case where the total traveling distance of the automobile M is 40 km.

FIG. 8 illustrates the seek bar SB and the slider SD3 in the seek bar SB. The leftmost position of the seek bar SB corresponds to a 0 km shooting start position of a series of moving images, and the rightmost position of the seek bar SB corresponds to the last shooting position of the series of moving images with a cumulative traveling distance of 40 km.

In FIG. 8, the slider SD3 is shown at the position corresponding to the cumulative traveling distance of 20 km-24 km on the seek bar SB. Moreover, FIG. 8 shows the thumbnail images SM13 to SM18 corresponding to the slider SD3. As shown in FIG. 8, the thumbnail images SM13 to SM18 are arranged at equal distance intervals of every 0.8 km.

For example, in FIG. 3, when the total traveling distance of the automobile M is 20 km, the thumbnail images are arranged at equal distance intervals of every 0.4 km. Comparatively, in FIG. 8, when the total traveling distance is 40 km, the thumbnail images are arranged at equal distance intervals of every 0.8 km. In other words, referring to FIG. 3 and FIG. 8, the thumbnail images are displayed at the increased (lengthened) distance intervals as the total traveling distance increases.

For example, when a plurality of frame images are extracted from a moving-distance retaining moving image, the plurality of frame images may be extracted to generate thumbnail images at the distance intervals that increase as the total traveling distance of the automobile M increases. Thus, even when the total traveling distance increases, the number of generated thumbnails to be searched for does not increase, and therefore, the complexity at the time of search is reduced and the user can search for desired thumbnail images efficiently.

Figure 9:
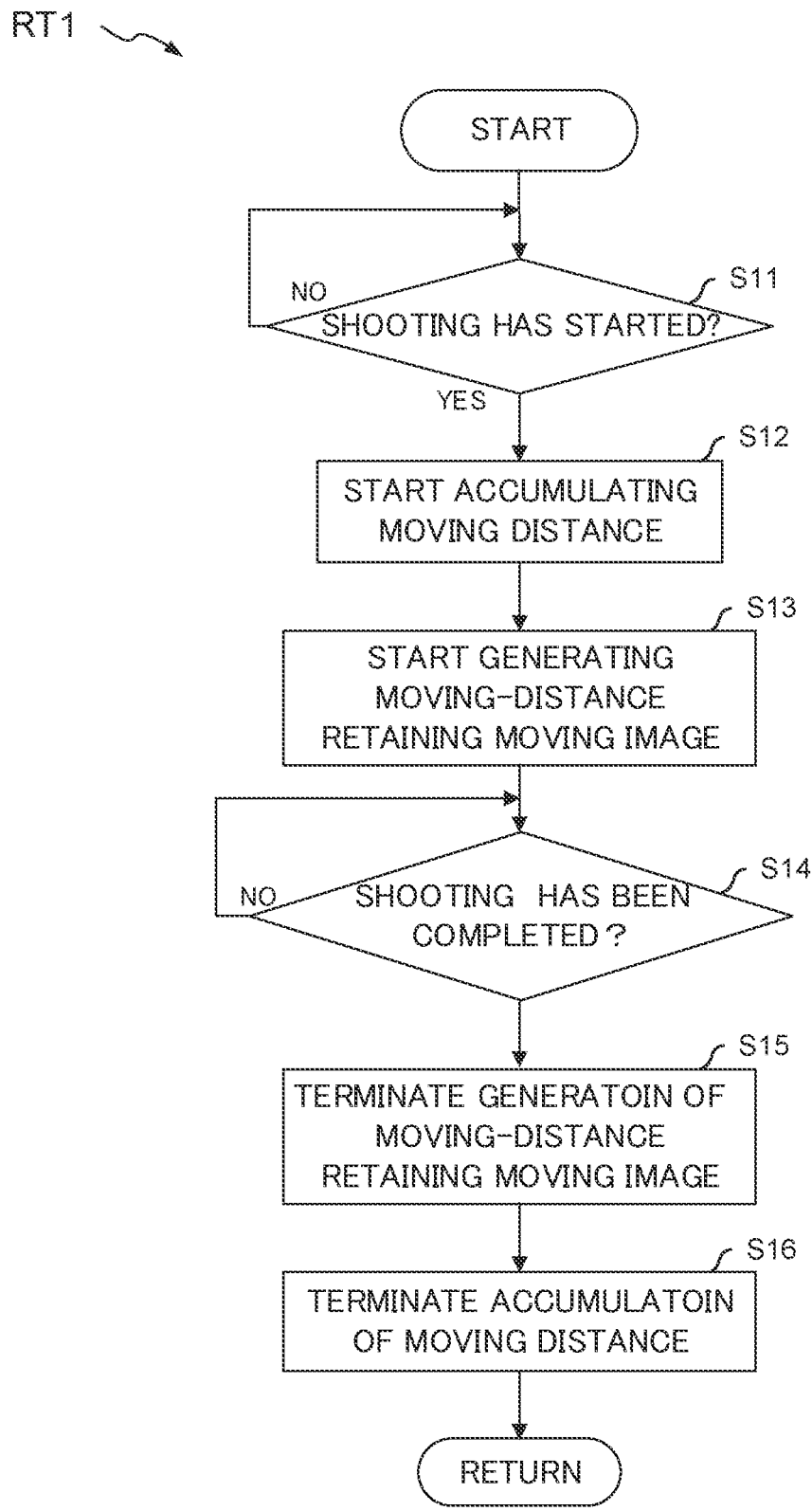
FIG. 9 is a flowchart illustrating an example of a routine to be executed in the embodiment.

FIG. 9 is a flowchart illustrating a moving-distance retaining moving image generating routine RT1, which is an example of a routine executed by the control unit 29 when a moving-distance retaining moving image is generated in this embodiment. The control unit 29 starts the moving-distance retaining moving image generating routine RT1 when the engine of the automobile M is turned on, for example.

When the control unit 29 starts the moving-distance retaining moving image generating routine RT1, the control unit 29 determines whether or not the shooting by the camera 13 has started (Step S11). In Step S11, the control unit 29 determines, for example, whether or not the power of the camera 13 is turned on via the input unit 19.

If the control unit 29 determines in Step S11 that the shooting has not started (Step S11: NO), Step S11 is repeated to determine again whether or not the shooting has started.

If the control unit 29 determines in Step S11 that the shooting has started (Step S11: YES), the control unit 29 starts to accumulate the moving distance (Step S12). In Step S12, the control unit 29 starts calculating the cumulative traveling distance from the time when the automobile M starts traveling and simultaneously a series of moving images starts to be shot based on the information obtained from the speed sensor 21 or the GPS receiver 22 via the input unit 19. In Step S12, the control unit 29 functions as a moving distance acquisition unit.

After executing Step S12, the control unit 29 starts acquiring the moving image shot by the camera 13, and starts generating a moving-distance retaining moving image by mapping each of a plurality of frame images constituting the moving image to the accumulated traveling distance of the automobile M at the time when each of the frame images is shot (Step S13). In Step S13, the control unit 29 functions as a moving-distance retaining moving image generating unit.

In Step S13, the control unit 29 maps the elapsed time since the start of traveling of the automobile M and the accumulated traveling distance during the elapsed time to every frame number attached to each frame image, as shown in, for example, FIG. 5.

For example, in Step S13, the control unit 29 may start storing the moving-distance retaining moving image in the storage unit 27. At the time of the storage, the control unit 29 functions as a recording control unit.

The control unit 29 determines whether or not the shooting by the camera 13 has been completed after the execution of Step S13 (Step S14). In Step S14, the control unit 29 determines, for example, whether or not the power of the camera 13 is turned off via the input unit 19.

If the control unit 29 determines in Step S14 that the shooting has not been completed (Step S14: NO), Step S14 is repeated to determine again whether or not the shooting has been completed.

If the control unit 29 determines in Step S14 that the shooting has been completed (Step S14: YES), the control unit 29 terminates the generation of the moving-distance retaining moving image (Step S15).

After the execution of Step S15, the control unit 29 terminates the accumulation of moving distance (Step S16). After the execution of Step S16, the control unit 29 returns to the beginning of the moving-distance retaining moving image generating routine RT1 and repeats the moving-distance retaining moving image generating routine RT1.

Figure 10:
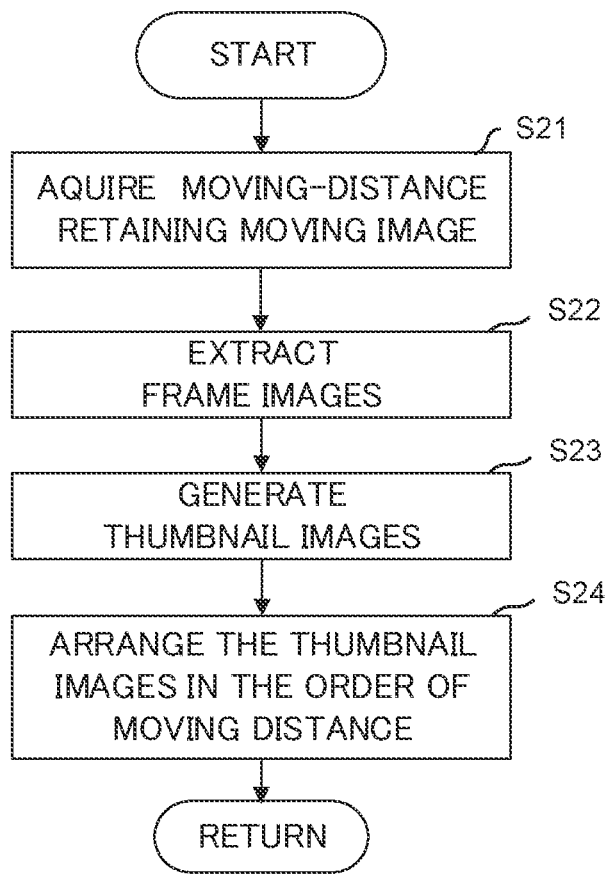
FIG. 10 is a flowchart illustrating an example of a routine to be executed in the embodiment.

FIG. 10 is a flowchart illustrating a thumbnail image generating routine RT2, which is an example of a routine that is executed by the control unit 29 when a thumbnail image is generated in this embodiment. For example, when the control unit 29 starts generating a moving-distance retaining moving image in the moving-distance retaining moving image generating routine RT1 (Step S13), the control unit 29 starts the thumbnail image generating routine RT2.

The control unit 29 acquires the moving-distance retaining moving image (Step S21). For example, in Step S21, the control unit 29 acquires the moving image shot by the camera 13 and data (for example, the table TB1) in which each of the frame images constituting the moving image are mapped to the elapsed time since the start of traveling of the automobile M and the accumulated traveling distance during the elapsed time. For example, the control unit 29 may acquire the moving-distance retaining moving image from the storage unit 27.

After the execution of Step S21, the control unit 29 extracts a plurality of frame images from the moving-distance retaining moving image (Step S22). In Step S22, for example, the plurality of frame images are extracted from all the frame images constituting the moving-distance retaining moving image such that the shooting locations of the frames are at equal distance intervals.

For example, in Step S22, the distance interval in the case where the plurality of frame images are extracted at equal distance intervals may be a constant distance interval regardless of the magnitude of the total traveling distance of the automobile M. Moreover, for example, in Step S22, the plurality of frame images may be extracted at the distance intervals that increase as the total traveling distance increases.

After the execution of Step S22, the control unit 29 generates thumbnail images by converting each of the extracted frame images into a thumbnail image (Step S23). For example, in Step S23, the control unit 29 generates a plurality of thumbnail images by reducing each of the plurality of frame images extracted in Step S22.

After the execution of Step S23, the control unit 29 arranges the thumbnail images in the order of cumulative moving distance (Step S24). For example, in Step S24, the control unit 29 generates a thumbnail image group in which each of the plurality of thumbnail images generated in Step S23 is arranged in the order of cumulative moving distance. For example, in Step S23, each of the plurality of thumbnail images is arranged in the order of increasing cumulative moving distances mapped to the frame images.

After the execution of Step S24, the control unit 29 returns to the beginning of the thumbnail image generating routine RT2 and repeats the thumbnail image generating routine RT2.

For example, the thumbnail image generating routine RT2 may be executed after the shooting of a series of moving images is completed, or may be executed in real time in parallel with the shooting of a series of moving images. For example, when the RT2 is executed in real time, the latest frame image corresponds to the total traveling distance at the present time.

As explained above, the present invention can generate a thumbnail image to be presented to the user in the playing of a moving image in which a landscape is shot from a moving body. The thumbnail image is generated by extracting and converting a frame image that constitutes the moving image into a thumbnail image based on the cumulative moving distance of the moving body at the time when the frame image is shot. Therefore, without being affected by the moving speed of the moving body, the thumbnail image mapped to the cumulative moving distance is generated.

Thus, when searching for the location where the user wants to start playing the moving image, the user can efficiently search using the thumbnail images mapped to the cumulative moving distances of the moving body from the time when the shooting of the moving image starts to the time when each of the plurality of frame images constituting the moving image is shot, and thus can easily find the desired location in the moving image. Accordingly, the present invention provides an image generating apparatus, an image generating method, an image generating program, and a recording medium that enable efficient searching and easy finding of the desired location in the moving image.

[Modification]

With reference to FIGS. 11 to 14, the moving image playing apparatus 10 according to the modification of this embodiment will be described. The moving image playing apparatus 10 of this modification is configured similarly to the image generating apparatus 10 in the aforementioned embodiment. As mentioned above, the image generating apparatus 10 also functions as a moving image playing apparatus that controls the playing, fast-forwarding, and fast-rewinding of a series of moving images shot by the camera 13. In this modification, the speeds of playing, fast-forwarding and fast-rewinding are controlled to be in accordance with the total traveling distance of the automobile M between the beginning and the end of shooting the series of moving images.

FIG. 11 is a diagram illustrating the table TB2, which is an example of data that is used when the moving image playing apparatus 10 in this modification controls the playing, fast-forwarding or fast-rewinding of a series of moving images.

The table TB2 lists the playing speed and fast-forwarding/fast-rewinding speed for every total traveling distance (km). The playing speed and fast-forwarding/fast-rewinding speed are shown as multipliers to a basic speed, which is determined based on a time code attached to the moving image.

As shown in FIG. 11, in the table TB2, the fast-forwarding/fast-rewinding speed is "×10" (10 times) for each of the total traveling distances of 0.5 km, 1 km, and 5 km. In the table TB2, when the total traveling distance is 10 km or more, the fast-forwarding/fast-rewinding speed increases as the total traveling distance increases.

For example, in the play control using the data of the table TB2, with the threshold of total traveling distance being 10 km, the fast-forwarding/fast-rewinding speed is controlled to become faster when the total traveling distance is equal to or greater than the threshold.

This control inhibits the time required for fast-forwarding/fast-rewinding from becoming too long even when the recording time becomes long due to a larger total traveling distance. Thus, when the user searches for a desired portion of a moving image by fast-forwarding or fast-rewinding, the user can search efficiently by reducing the complexity of switching the playing speed or fast-forwarding speed, or the like.

Also, as shown in FIG. 11, in the table TB2, when the total traveling distance is 0.5 km, 1 km, or 5 km, the playing speed is "×1.0" (1 time), which is the standard speed. In the table TB2, when the total traveling distance is 10 km or more, the playing speed becomes faster as the total traveling distance increases.

For example, in the play control using the data of the table TB2, with the threshold of total traveling distance being 10 km, the playing speed is controlled to become faster when the total traveling distance is equal to or greater than the threshold.

This control inhibits the time required for playing from becoming too long even when the total traveling distance becomes large. Thus, the user can play a series of moving images and watch the moving images comfortably without feeling stress.

Further, the aforementioned multipliers for playing and fast-forwarding/fast-rewinding in the table TB2 are merely an example, and can be set appropriately according to the traveling speed of the automobile M, or the like. For example, different multipliers may be used when the area to be traveled in is a highway and when the area is an urban area. Moreover, the threshold of total traveling distance is, for example, 10 km in FIG. 11, but is not limited to this. For example, a distance shorter than 10 km may be used as the threshold, and a distance longer than 10 km may be used as the threshold. Any threshold can be set as appropriate for the total traveling distance. In addition, playing, fast-forwarding or fast-rewinding may always be controlled according to the total traveling distance without setting a threshold.

Figure 12:
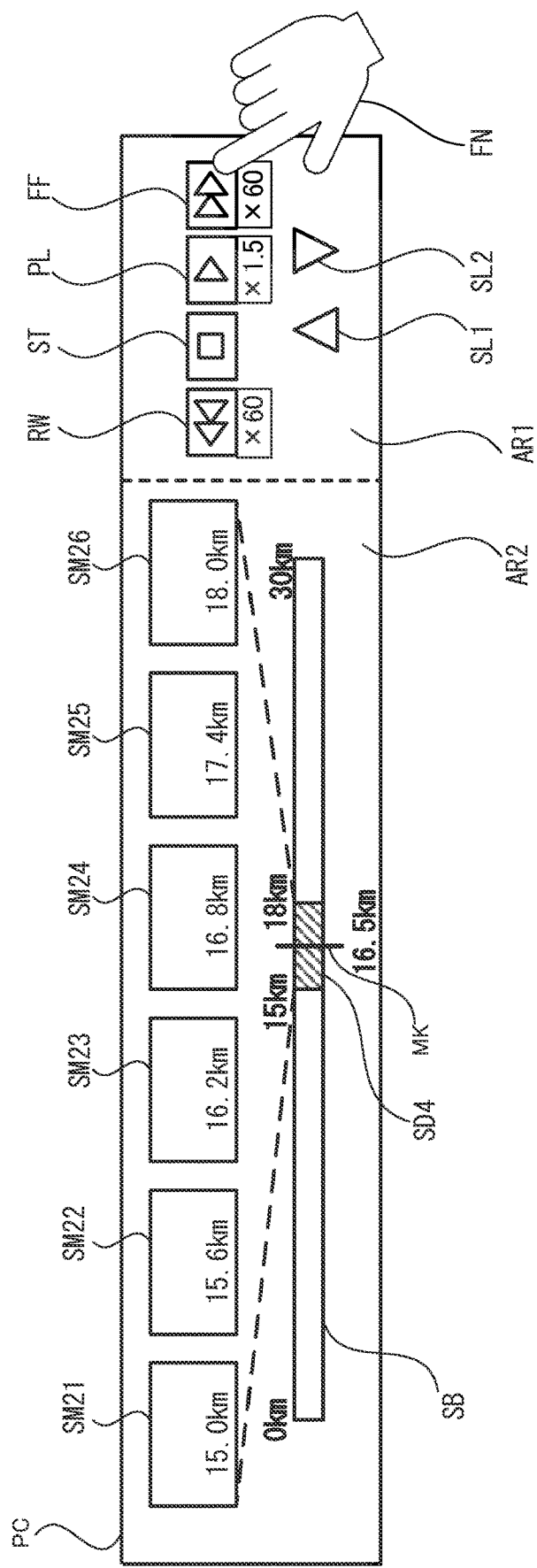
FIG. 12 is a diagram illustrating an example of image displayed on the touch panel according to the modification of the embodiment.

FIG. 12 is a diagram illustrating an example of the play operation image PC displayed on the touch panel 17 of the moving image playing apparatus 10 according to a modification of this embodiment.

FIG. 12 shows the user's finger FN touching the area in the button area AR1 where a fast forward button FF is displayed and pressing the fast forward button FF. In FIG. 12, the speed at which playing, fast-forwarding or fast-rewinding is performed for a series of moving images is displayed for each of the play button PL, fast forward button FF, and fast rewind button RW.

Specifically, in FIG. 12, "×60" is displayed near the fast forward button FF. The display indicates that when fast-forwarding of the moving image is controlled by the moving image playing apparatus 10 of this modification, the fast-forwarding speed is controlled to be 60 times as fast as the basic playing speed.

Further, "×60" is also displayed near the fast rewind button RW, indicating that the fast-rewinding speed is controlled to be 60 times as fast as the basic playing speed.

In addition, "×1.5" is displayed near the play button PL. The display indicates that the playing speed is controlled to be 1.5 times as fast as the basic playing speed by the moving image playing apparatus 10 of this modification.

In this modification, the moving image playing apparatus 10 controls the fast-forwarding of the moving image displayed on the first display 15 upon receiving an operation to the fast forward button FF. In the example shown in FIG. 12, a moving image controlled to fast forward at 60 times the basic speed is displayed on the first display 15 (see FIG. 2).

As shown in FIG. 12, the seek bar SB is displayed in the search area AR2 and the slider SD4 is displayed within the seek bar SB. For example, as mentioned above, the image shot at the location where the traveling distance of the automobile M is the cumulative traveling distance corresponding to the marker MK, the center of the slider SD4, is displayed on the first display 15.

For example, the slider SD4 with the marker MK at the center may move on the seek bar SB as the moving image progresses by fast forwarding. In addition, the thumbnail images corresponding to the thumbnail display section indicated by the slider SD4 may be displayed following the movement of the slider SD4 due to fast forwarding. Furthermore, in this modification, the thumbnail images do not have to be displayed.

Figure 13:
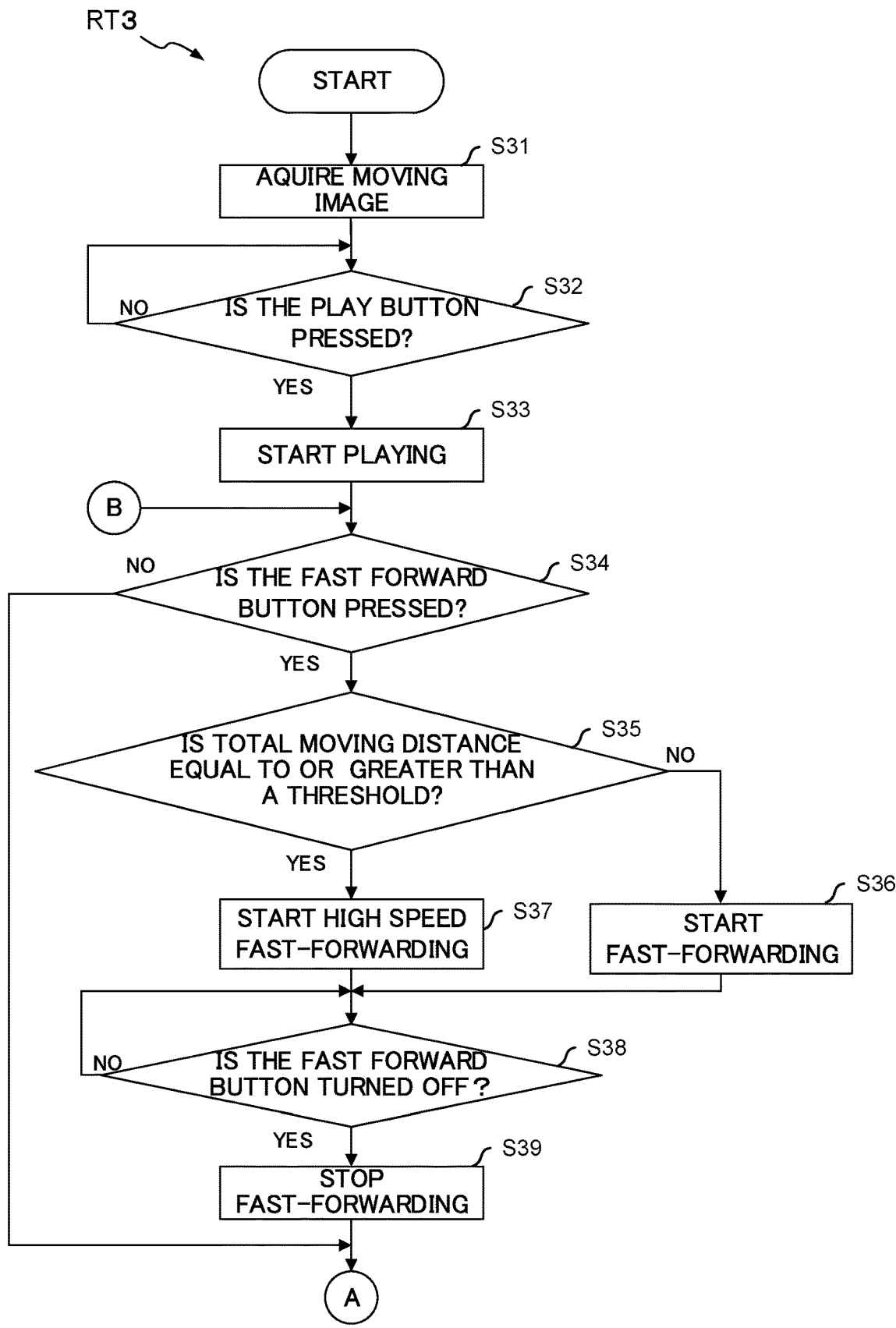
FIG. 13 is a flowchart illustrating an example of a routine to be executed in the modification of the embodiment.
Figure 14:
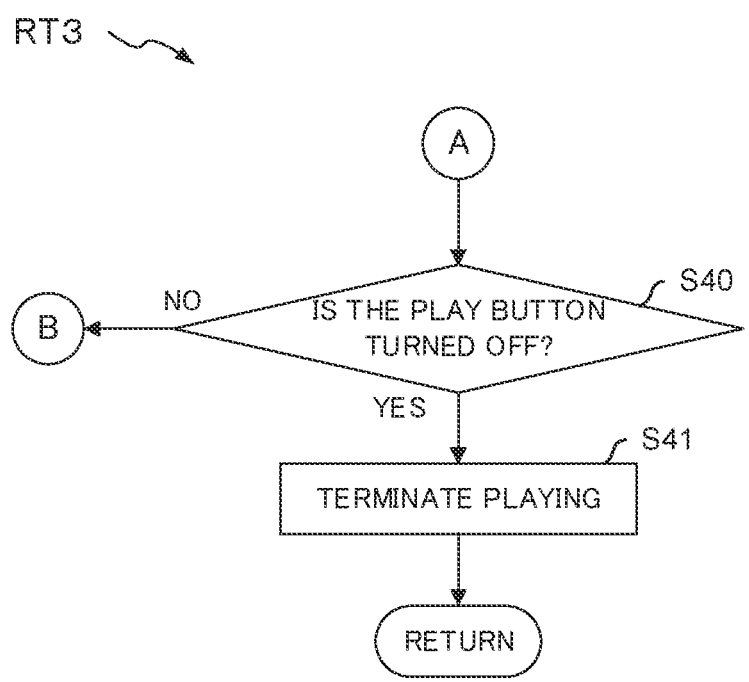
FIG. 14 is a flowchart illustrating an example of a routine to be executed in the modification of the embodiment.

FIG. 13 and FIG. 14 are flowcharts illustrating a fast-forward control routine RT3, which is an example of a routine executed by the control unit 29 when controlling the fast-forwarding of a series of moving images. The control unit 29, for example, starts the fast forward control routine RT3 when the shooting of a series of moving images is completed.

The control unit 29 as the moving image acquisition unit acquires a series of moving images shot by the camera 13 via the input unit 19 when the fast forward control routine RT3 is started (Step S31).

After the execution of Step S31, the control unit 29 determines whether or not the play button PL of the play operation image PC is pressed (Step S32). In Step S32, the control unit 29 functions as the operation reception unit and determines whether an instruction operation that instructs playing by touching the play button PL is received or not. For example, in Step S32, the control unit 29 determines whether or not a playing instruction operation has been received via the input unit 19 and touchpad 17B.

If the control unit 29 determines that the play button is not pressed in Step S32 (Step S32: NO), Step S32 is repeated to again determine whether or not the play button is pressed.

If the control unit 29 determines that the play button is pressed in Step S32 (Step S32: YES), the control unit 29 starts playing a series of moving images (Step S33). For example, in Step S33, the control unit 29 outputs a video of playing a series of moving images to the first display 15.

After the execution of Step S33, the control unit 29 determines whether or not the fast forward button FF of the play operation image PC is pressed (Step S34). In Step S34, the control unit 29 functions as the operation reception unit and determines whether an instruction operation that instructs fast-forwarding by, for example, touching the fast forward button FF is received or not. For example, in Step S34, the control unit 29 determines whether or not a fast-forwarding instruction operation has been received via the input unit 19 and touchpad 17B.

If the control unit 29 determines in Step S34 that the fast forward button FF is pressed (Step S34: YES), the control unit 29 determines whether the total moving distance (total traveling distance), which is the moving distance of the automobile M from the time when the series of moving images starts to be shot to the time when the shooting is finished, is equal to or greater than a threshold (Step S35).

In Step S35, the control unit 29 refers to, for example, the table TB2 shown in FIG. 11 to determine, for example, whether the total traveling distance is equal to or greater than the threshold for changing the fast-forwarding speed.

If the control unit 29 determines in Step S35 that the total moving distance is not equal to or greater than the threshold (Step S35: NO), the control unit 29 starts controlling the fast-forwarding of the series of moving images to be at a normal fast-forwarding speed (Step S36). In Step S36, control of fast-forwarding is started at, for example, 10 times the basic speed.

If the control unit 29 determines in Step S35 that the total moving distance is equal to or greater than the threshold (Step S35: NO), the control unit 29 starts controlling the fast-forwarding to be at a speed higher than the normal fast-forwarding speed (Step S37). For example, using the table TB2, when, for example, the total moving distance is 30 km, fast-forwarding starts to be controlled to be at 60 times the standard speed that is faster than 10 times the standard speed, which is the normal fast-forwarding speed.

In Step S36 and Step S37, the control unit 29 controls the fast forwarding of the series of moving images to be at a speed corresponding to the total moving distance. In addition, the control unit 29 can control the fast-rewinding of the series of moving images at a speed corresponding to the total moving distance in the same way as controlling the fast-forwarding.

After the execution of Step S36 or Step S37, the control unit 29 determines whether or not the fast forward button is turned off (Step S38). In Step S38, for example, the control unit 29 determines that the fast forward button is turned off when the user's finger FN leaves the fast forward button FF of the play operation image PC.

If the control unit 29 determines that the fast forward button is not turned off in Step S38 (Step S38: NO), it repeats Step S38 while continuing to control fast-forwarding and determines again whether the fast forward button is turned off.

If the control unit 29 determines that the fast forward button is turned off in Step S38 (Step S38: YES), it stops controlling the fast forwarding of the series of moving images (Step S39). In Step S39, for example, when the control for fast-forwarding is stopped, the moving image that is being displayed on the first display 15 in a fast-forwarding state may be stopped and a still image may be displayed. In addition, for example, when the control for fast-forwarding is stopped, the moving image that is being displayed on the first display 15 in the fast-forwarding state may return to the state of controlling the playing.

After the execution of Step S39, or after the control unit 29 determines that the fast forward button is not pressed in Step S34, the control unit 29 determines whether or not the play button is turned off (Step S40). For example, in Step S40, when the stop button of the play operation image PC (FIG. 12) is pressed, it is determined that the play button is turned off.

If the control unit 29 determines that the play button is not turned off in Step S40, the control unit 29 returns to Step S34 and again determines whether the fast forward button is pressed.

If the control unit 29 determines that the play button is turned off in Step S40, the control unit 29 terminates the control for playing (Step S41). Then, the control unit 29 repeats the fast forward control routine RT3.

In Steps S33 to S41, the control unit 29 functions as the play control unit.

In addition, when the control for playing is started in Step S33, the series of moving images may be played at a speed corresponding to the total traveling distance. For example, the greater the total traveling distance, the faster the speed at which the series of moving images may be played. For example, as shown in the table TB2 in FIG. 11, the series of moving images may be played at the basic speed up to a predetermined total traveling distance, and when it exceeds the predetermined total traveling distance, the series of moving images may be played at a speed faster than the basic speed.

As explained above, according to this modification, when the user searches for the location where the user wants to start playing the moving image in the case of playing the moving image in which a landscape is shot from a moving body, when the total traveling distance is long, fast-forwarding and fast-rewinding can also be controlled to be at a speed faster than usual. Accordingly, it is possible to provide a moving image playing apparatus, a moving image playing method, a moving image generating program, and a recording medium that enable efficient searching and easy finding of the desired location in the moving image.

Furthermore, the above embodiment and modification describe examples of determining the extraction manner and fast-forwarding speed of frame images when generating thumbnail images according to the total traveling distance, which is the moving distance of the automobile M from the start to the end of shooting a series of moving images.

With respect to the total traveling distance, for example, when a portion of the entire shot moving image is specified as the portion to be played, or when playing a portion of the shot moving image that is extracted as the portion to be played, the traveling distance of the automobile M from the beginning time to the end time of the portion to be played may be used as the total traveling distance to determine the extraction manner or fast-forwarding speed of the frame images.

Further, the above embodiment and modification describe the case in which the image generating apparatus 10 is mounted on a moving body, but the invention is not limited to this case. For example, the image generating apparatus 10 may be mounted on a terminal apparatus carried by the user.

The example in which a camera for acquiring moving images is provided in a moving body is described, but the invention is not limited to this example. At least the acquisition of moving images should be accompanied by movement. For example, the image generating apparatus 10 may be provided at a location different from the moving camera, and should be able to acquire moving images shot by that camera.

In addition, the example of the first display 15 being provided on the window of the automobile M is described, but the invention is not limited to this. The first display 15 should be capable of displaying videos played by the control unit 29 which functions as the play control unit.

Moreover, the first display 15 is not limited to being transparent, and may be translucent or opaque.

Further, the example of the second display 17A being provided as a separate entity from the first display 15 is described, but the invention is not limited to this example. For example, a portion of the moving image display surface 15A of the first display 15 may be provided with an area where an image for operation can be displayed, and may display the play operation image PC.

The configurations in the aforementioned embodiment and modification are only examples, and can be selected and modified as appropriate depending on the intended use, or the like.

DESCRIPTION OF REFERENCE SIGNS

10 Image generating apparatus, Moving image playing apparatus
13 Camera
15 First display
17 Touch panel
17A Second display
17B Touchpad
18 System bus
19 Input unit
21 Speed sensor
22 GPS receiver
23 Output unit
24 Speed sensor
25 Operation input unit
27 Storage unit
29 Control unit

The invention claimed is:

1. An image generating apparatus comprising:
a processor configured to:
acquire a series of moving images of a landscape shot from a moving body;
acquire a cumulative moving distance from a time when shooting of the series of moving images is started to a time when each of a plurality of frame images constituting the series of moving images is shot;
generate a moving-distance retaining moving image in which the cumulative moving distance at each time of shooting is mapped to each of the plurality of frame images; and
extract a plurality of frame images from the moving-distance retaining moving image as a plurality of thumbnail images according to the cumulative moving distance and generates a thumbnail image group arranging the plurality of thumbnail images in an order of the cumulative moving distance.

2. The image generating apparatus according to claim 1, wherein the processor extracts the plurality of frame images from the moving-distance retaining moving image such that differences in the cumulative moving distance are equal.

3. The image generating apparatus according to claim 1, wherein the processor extracts the plurality of frame images in a manner based on a total moving distance as a moving distance of the moving body from a beginning to an end of shooting the series of moving images.

4. The image generating apparatus according to claim 3, wherein the processor extracts the plurality of frame images at distance intervals that increase as the total moving distance increases.

5. An image generating method for an image generating apparatus generating a thumbnail image group, the image generating method comprising:
- acquiring a series of moving images of a landscape shot from a moving body by a processor of a computer;
- acquiring a cumulative moving distance from a time when shooting of the series of moving images is started to a time when each of a plurality of frame images constituting the series of moving images is shot by the processor;
- generating a moving-distance retaining moving image in which the cumulative moving distance at each time of shooting is mapped to each of the plurality of frame images by the processor; and
- extracting a plurality of frame images from the moving-distance retaining moving image as a plurality of thumbnail images according to the cumulative moving distance and generating a thumbnail image group arranging the plurality of thumbnail images in an order of the cumulative moving distance by the processor.

6. A non-transitory recording medium storing instructions to be executed by an image generating apparatus including a computer, causing a processor of the computer to execute:
- acquiring a series of moving images of a landscape shot from a moving body by the processor;
- acquiring a cumulative moving distance from a time when shooting of the series of moving images is started to a time when each of a plurality of frame images constituting the series of moving images is shot by the processor;
- generating a moving-distance retaining moving image in which the cumulative moving distance at each time of shooting is mapped to each of the plurality of frame images by the processor; and
- extracting a plurality of frame images from the moving-distance retaining moving image as a plurality of thumbnail images according to the cumulative moving distance and generating a thumbnail image group arranging the plurality of thumbnail images in an order of the cumulative moving distance by the processor.

* * * * *